Feb. 6, 1940.    L. HUTH    2,189,466
FROSTPROOF JACKET
Filed Jan. 17, 1939
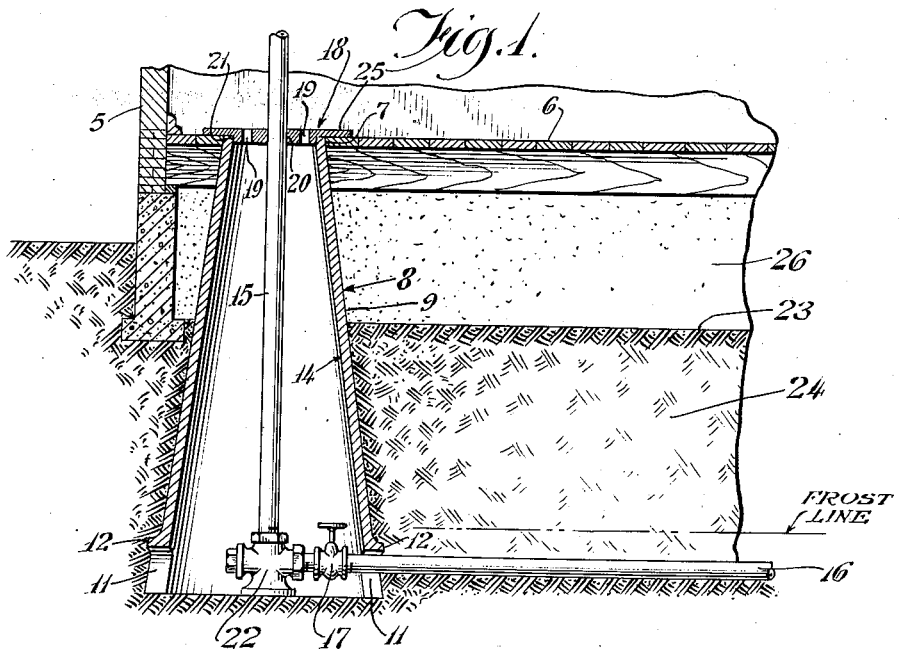
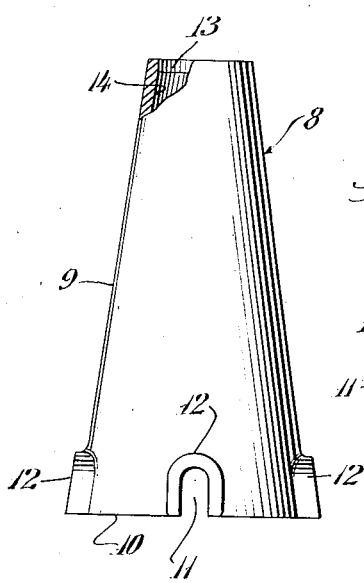
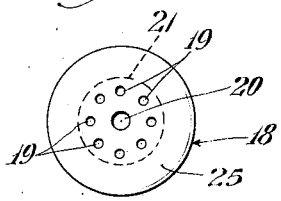
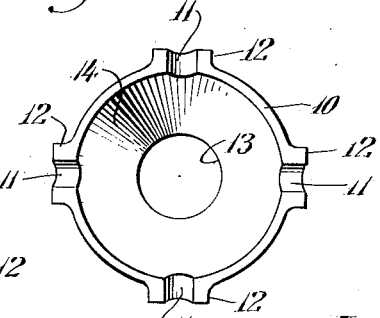
Inventor
Ludwig Huth
By David Manly Heller
Attorney.

Patented Feb. 6, 1940

2,189,466

UNITED STATES PATENT OFFICE 2,189,466

FROSTPROOF JACKET

Ludwig Huth, Burlington, Iowa

Application January 17, 1939, Serial No. 251,400

2 Claims. (Cl. 137—13)

This invention relates to means to prevent freezing of water in water mains and outlets extending above the frost line, in the ground.

An object of this invention is the provision of a jacket which is imbedded in the earth below the frost line, and adapted to provide an insulation from the cold or freezing temperature which otherwise would freeze the water within the main or conduit.

Another object of the invention is to provide a simple, practical, efficient, and useful structure for the purposes outlined, and which is also economical to manufacture in quantity production.

Other features and advantages resident in the invention at bar may become apparent by reference to the drawing in which like symbols designate like parts throughout and in which:

Fig. 1 is a cross-sectional view showing the arrangement of my invention as applied to a conduit leading into a building.

Fig. 2 is a front elevational view of the jacket element of my invention.

Fig. 3 is a top plan view of the cover element of my invention.

Fig. 4 is a plan view looking at the bottom of Figure 2.

Water mains leading to homes or buildings are usually buried in the ground a depth sufficient to prevent such water mains from freezing, and those mains are usually three to four feet below the surface of the ground. However, the upright water main or outlet connected to the primary main leading to the building, extends vertically upward and it is this portion that is subject to freezing and ice formation within it.

When this occurs, naturally, the liquid water in the primary main cannot pass upward thru the ice formed, and hence the purpose of my invention is to obviate and eliminate difficulties which occur, when the outside temperature conditions are below 32 degrees Fahrenheit, namely water freezing temperature.

In order to accomplish the foregoing purpose reference being had to Figure 1, I show a building generally designated by the numeral 5, having a main floor designated by the numeral 6, below which there is a sufficient air space designated by the numeral 26, the surface of the ground underneath the building, designated generally by the numeral 23 and 24 designating the earth or ground below the building.

The frost line as indicated on the drawing is usually about three feet below the upper surface, and as can be seen the primary water main designated by the numeral 16 is sufficiently below this frost line in order to prevent the water within this main from freezing. This main is attached to a valve 17 which may be of the standard type, either a gate valve or a globe valve, and in turn is connected thru a nipple to a cross, elbow or other such similar fitting, designated by the numeral 22.

To this last fitting designated by the numeral 22 is attached the water pipe 15 leading up to the tap in the sink of a building. It is the water in this main that is subject to freezing, which in turn prevents the water in the primary main 16 from circulating up and thru the tap for general use and consumption.

In installing my invention which comprises the jacket designated generally by the numeral 8 and the cover designated generally by the numeral 18, a hole is dug into the ground in order to reach the globe valve 17 and the primary main 16, the hole being dug sufficiently large to permit installation of the jacket 8.

The jacket 8 as can be seen comprises a tapered or conical section having the tapered shape 9 being provided at its lowest portion or at the base designated by the numeral 10 with a number of U shaped openings designated by the numeral 11. Inasmuch as this jacket may be cast in production, hence in order to reinforce the opening and not to weaken the jacket structure generally, the U shaped openings 11 are reinforced by U shaped bosses designated by the numeral 12.

The inner portion of the jacket 14 is hollow and of such a dimension as to provide the jacket with a suitable thickness for strength and durability. The jacket is provided at its top surface with a machined or cast hole designated by the numeral 13 which is adapted to receive the shoulder 21 of the cover 18.

The second element comprising my invention is the cover designated generally by the numeral 18 which is provided with a flange portion designated by the numeral 25 and is also provided with a clearance hole 20 to permit the pipe 15 to pass therethru easily and without any difficulty.

The flange is provided with a boss or projection designated by the numeral 21 which fits snugly into the hole 13 of the jacket designated by the numeral 8. The cover element generally designated 18 is also provided with series of holes designated by the numeral 19 which will permit to some extent the heat within a room to pass therethru and circulate within the opening 14, of the jacket member.

In placing this arrangement within a building which has already been constructed, it is first necessary to dig a hole sufficiently large to permit the jacket to be placed over the primary main 16 so that one of the U shaped openings 11 straddles this primary main and seats or locates itself with reference thereto.

The valve 17 will have to be utilized in order to shut off the flow of the water within the primary main during this opertion, which will permit the removal of the pipe member 15. A hole designated by the numeral 7 will have to be bored in the floor proper designated by the numeral 6 in order to accommodate the upper portion of the jacket and hold it snugly and rigidly in place.

The earth 24 is then filled in so as to hold the outer tapered portion 9 of the jacket and hold it rigidly in place. The pipe 15 is then placed or passed thru the hole 20 of the cover designated generally by the numeral 18 and threaded into the cross or other fitting which may be used as designated by the numeral 22.

The top portion or flange portion 25 may be nickel plated or chromium plated, so as to present a neat appearance to the floor portion of the room. The entire structure is thus concealed and is not open to view, in no way defacing or disfiguring the floor of the room.

After this structure is in place it is readily obvious that the arrangement will provide a useful and beneficial structure, in that it will prevent the water in the secondary main from freezing and thus eliminate the difficulties heretofore outlined.

Altho I have revealed my invention by presenting a preferred form thereof, and inasmuch as it may be susceptible of many changes, modifications, alterations and improvements, I reserve the right to all such changes, modifications, alterations and improvements which may come within the scope of the drawing, description, and the appended claims.

Having thus described my invention what I claim as new and desire to secure by Letter Patent is:

1. A device of the character described comprising, a hollow jacket member shaped substantially to resemble the frustum of a cone, provided with a number of U shaped recesses at its base portion, the said jacket member being of sufficient length to span the distance between the floor of a room and the frost line below the surface of the ground, the jacket member also provided with an opening at its top portion adapted to receive a cover member, and a cover member provided with an extension adapted to fit snugly into the top opening of said jacket member, said cover member also provided with a hole adapted to fit slidably over a pipe, and a series of vent holes in order to permit heated currents from a room to circulate within the confines of said jacket member.

2. A device of the character described comprising, a hollow jacket member shaped substantially to resemble the frustum of a cone, provided with a number of U shaped recesses at its base portion, adapted to locate firmly and rigidly said jacket in the ground and also to permit positioning said jacket base portion below a primary main, the said jacket member being of sufficient length to span the distance between the floor of a room and the frost line below the surface of the ground, the said jacket member also provided with an opening at its top portion adapted to receive a cover member, and a cover member provided with an extension adapted to fit snugly into the top opening of said jacket member, said cover member also provided with a hole adapted to fit slidably over a pipe, and a series of vent holes in order to permit heated currents from a room to circulate within the confines of said jacket member.

LUDWIG HUTH.